United States Patent
Okamura et al.

[15] 3,664,861
[45] May 23, 1972

[54] COATING PROCESS

[72] Inventors: Seizo Okamura, Kyoto-fu; Koji Odan, Kanagawa-ken; Tsutomu Maruyama, Kanagawa, all of Japan

[73] Assignee: Kansai Paint Company Limited, Amagasaki-shi, Hyogo-ken, Japan

[22] Filed: Feb. 26, 1969

[21] Appl. No.: 802,658

[30] Foreign Application Priority Data

Mar. 1, 1968    Japan......................43/12874

[52] U.S. Cl..............117/93.31, 117/161 KP, 260/77.5 AN
[51] Int. Cl.........................................B44d 1/50
[58] Field of Search................260/77.5; 117/93.31, 161 KP; 204/159.16, 159.22

[56] References Cited

UNITED STATES PATENTS

| | | | |
|---|---|---|---|
| 3,245,941 | 4/1966 | Mayer et al. | 260/77.5 |
| 3,297,745 | 1/1967 | Fekete et al. | 260/77.5 |
| 3,509,234 | 4/1970 | Burlant et al. | 260/77.5 |

*Primary Examiner*—Ralph S. Kendall
*Attorney*—Wenderoth, Lind & Ponack

[57] ABSTRACT

A process for coating articles which comprises the steps of causing a reaction between a methacrylic acid ester having hydroxyl groups and an isocyanate compound having at least two isocyanate groups in its molecule to obtain a partially urethanated compound, causing a reaction between said partially urethanated compound and a polyester having a hydroxyl group to produce an unsaturated polyester composition, applying said unsaturated polyester composition to articles to be coated, and irradiating ionizing radiation on the films of said unsaturated polyester composition formed on said articles, thereby obtaining hard but not brittle coatings on said articles.

8 Claims, No Drawings

COATING PROCESS

The present invention relates to a process of coating an article using an unsaturated polyester composition modified by polyisocyanate compounds, and curing it by irradiation of ionizing radiation.

The object of the present invention is to provide an unsaturated polyester composition appropriate for the above-mentioned coating process and to provide a coating which has a high degree of hardness and excellent flexibility.

Recently, with the development of the technique of radiation chemistry, since the process of coating various articles with paints and curing the coated film by irradiation of ionizing radiation has various industrial advantages, the adoption of this process has been increased gradually. As for the coating composition used for these procedures, unsaturated polyester composition is found to be effective, which is obtained by dissolving a polymer having radically polymerizable double bond in the molecule chain into liquid monomer having radically polymerizing property such as styrene, methyl methacrylate, and the composition having this system has been used practically. However, the film formed by unsaturated polyester composition is, in general, brittle and hard, so that the use of it is restricted on wood or as putty (for filling) for metal where no flexibility is required. Softened polyesters blended with much of component such as adipic acid and/or diethyleneglycol has generally a low degree of hardening, and the film is not practicable.

A serious disadvantage possessed by conventional unsaturated polyester composition is the fact that it is liable to be subjected to undesirable inhibition due to oxygen in the air in the cases of both using polymerization initiator of peroxide group and using ionizing radiation, because it is hardened by radical polymerization reaction mechanism. So this process may be applicable for comparatively thick layer having a thickness of several hundred microns or more, but when the coating has a relatively small thickness, for example, several tens of microns, which is more in general, as in the case of metal coating, it is impossible to increase the degree of hardness because of the adverse effect of inhibition resulting in a soft and fragile coating, and no film is obtained which has a practical merit.

The inventors have studied to improve the above-mentioned disadvantages, and synthesized an unsaturated polyester which is suitable for the case where a high degree of flexibility is required in the coated film as in the coil coating for metals such as for galvanized steel plates, and accomplished the process of the present invention in applying the process of radiation curing of the coated film.

As for the ionizing radiation, electromagnetic waves such as X-ray, γ-ray, and corpuscular beams such as electron beam β-ray, α-ray, or neutron beam can be mentioned. The chemical actions of these rays are similar among themselves and any of them may be used effectively. Recently, since high power electron accelerator is available and which is appropriate to produce radiation-chemical reaction in industrial scale, by use of the electron beam, the process according to the present invention can easily be put to practice industrially.

Conventional process of hardening unsaturated polyester paints is usually to add a redox polymerization initiator such as methyl ethyl ketone peroxide and cobalt naphthenate. However, in the method using the irradiation of ionizing radiation, particularly electron beam produced by electron accelerator, it is not necessary to add the polymerization initiator before applying unsaturated polyester paints, and curing takes place instantaneously. Accordingly the process is simplified, and the hardened film has a remarkably high degree of curing.

In general, hardened unsaturated polyester composition is characterized by its hardness together with brittleness, and this brittleness becomes remarkable with the increase in degree of curing. The cause of this disadvantage is that the unsaturated polyester which becomes the stem in molecular stracture, has a relatively low molecular weight. Therefore, in order to decrease the brittleness, it is preferable to use a resin having linear long chain molecules as possible. But, such polyester having a high molecular weight has a high solution viscosity and is liable to cause troubles in applying. Thus it is necessary to control the viscosity in a predetermined range, which is usually effected by increasing the monomer components, or by adding organic solvents, so that the expected hardened tough coating film cannot be obtained. Accordingly, in order to obtain a strong film, it is advantageous to use polyester having a relatively low molecular weight, and causing to form a long linear molecule by mutual combination of terminals of polyester molecules through the curing of coated film, and for this purpose, it is preferable that functional groups having polymerizing property are made to connect at the terminals of polyester molecules.

Generally, α, β-unsaturated dicarboxylic acids such as maleic acid, fumaric acid, itaconic acid, etc. used as a polymerizing components of unsaturated polyester, distributes in molecule chain of polyester at random when producing polyester by condensing with polyalcohols such as glycols, and they do not effect favorably on the curing with the linear propagation of polyester molecules. Therefore, it will be necessary in order to achieve the aim, to provide with functional groups having a strong polymerizing property onto the terminals of the molecular chain of polyester.

The process according to the present invention consists of combining methacrylic group as polymerizing functional group mainly to the terminals of the molecular chain of polyester as the combining means therefor, and reaction using polyisocyanate compounds is utilized. So the process has an advantage that, according to the above disclosure, the linear propagation of molecule is attained in curing of polyester composition.

Methacrylic acid has a strong polymerizing property, so it polymerizes considerably merely by heating it to a high temperature, for example, 100° - 150° C without particular addition of polymerization initiator. Also the methacrylic acid has a relatively low boiling point (161° C), then esterification of the system containing considerable amount of it cannot be carried out by heating in an order of 200° C unless it is effected under a high pressure. Therefore, it is quite difficult to combine methacrylic group with polyester to a degree useful as a polymerizing component in unsaturated polyester composition, thus it is not generally practised as yet.

In the present invention, without effecting the above-stated difficult means, we have found a process, in which the combination is carried out by a reaction, as an indirect reaction means at a room temperature or near thereto, and in which methacrylic group itself will not cause a remarkable polymerization. That is, the object is attained by using, instead of methacrylic acid, β-hydroxyethyl methacrylate (hereinafter referred as "HEMA") which is the esterified compound of methacrylic acid, or hydroxypropyl methacrylate (hereinafter referred as "HPMA"), the product in market is, for example, a mixture of about 70 percent of 2-hydroxy-propyl methacrylate and about 30 percent of 2-hydroxy-1-methyletyl methacrylate, causing an urethane combination in the presence of polyisocyanate, and to introduce methacrylic group into polyester.

Since, isocyanate group reacts easily with functional groups having active hydrogen such as hydroxyl group, amino group, carboxyl group, etc., the methacrylic acid derivatives to be reacted with isocyanate are not necessarily a compound having hydroxyl group such as HEMA, but it is advantageous because of the higher velocity of urethane formation by the reaction between hydroxyl group and isocyanate group, and because of easy availability of HEMA or HPMA in the present market, and the process can immediately be put into practice industrially.

Generally, the formation of urethane combination by reaction between isocyanate and hydroxyl groups proceeds easily at a room temperature or by heating at relatively low temperature according to the following formula:

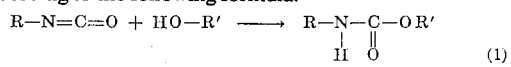

(1)

wherein R and R' represent alkyl, aryl, alkaryl (alkylaryl), aralkyl (arylalkyl) groups, etc.

As for the polyisocyanate compounds used for the process according to the present invention, numerous compounds may be employed. Some of them are listed as follows:

| Tolylene diisocyanate | $C_6H_3CH_3(NCO)_2$ | (2) |
| Xylylene diisocyanate | $C_6H_4(CH_2NCO)_2$ | (3) |
| Hexamethylene diisocyanate | $OCN(CH_2)_6NCO$ | (4) |
| Diphenylmethane-4,4'-diisocyanate | $OCNC_6H_4CH_2C_6H_4NCO$ | (5) |
| Desmodur L (Trade name, manufactured by Farbenfabriken Bayer A.G., Germany) | $H_5C_2C(CH_2OCONHC_6H_3CH_3NCO)_3$ | (6) |
| Desmodur N (Trade name, manufactured by Farbenfabriken Bayer A.G., Germany) | $OCN(CH_2)_6N[CONH(CH_2)_6NCO]_2$ | (7) |

In the above materials, (2) to (5) are diisocyanates, and (6) and (7) are triisocyanates. The isocyanates used in the process of the present invention can be any of those which have two or more isocyanate groups in one molecule.

Embodimentally, the process according to the present invention consists of two steps. Namely, the first step is to produce a partially urethanated compound by adding HEMA and the like to the polyisocyanate compounds. The ratio of these materials is such that, as shown in the following formula, for one mol of polyisocyanate compound, leaving one equivalent of the isocyanate group unreacted, the remainder isocyanate groups are urethanated:

$R(NCO)_n + (n-1)HOCH_2CH_2OCOC(CH_3) = CH_2$

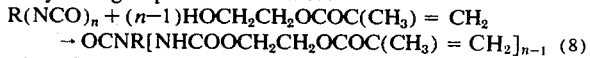

where R represents alkyl group, aryl group, etc. which is the stem of polyisocyanate compound, and $n$ is an integer including 2 and above.

This, however, shows a typical case of the process of the invention, the ratio of both material is not so critical as will be clear in the following descriptions.

The partial urethane formation is, in general, exothermic reaction, and in order to avoid the temperature rise, HEMA, for example, is added in small portions by dropping to the polyisocyanate compound, and the reaction is proceeded while controlling the temperature.

The second step is the one in which the partially urethanated compound obtained in the first step is combined with polyester. As for the polyester, any of saturated polyester which does not contain unsaturated bond in the molecule chain, or the unsaturated polyester using maleic anhydride or the like, may be used. Also polyesters using polyhydric alcohol, i.e., trihydric or more, or modified with mono-carboxylic acid, i.e., drying oil fatty acid, or other suitable polyesters may be used. Since the content of free hydroxyl group in these polyester gives a considerable effect on the reaction system, a special precaution must be taken therefor. The object of this step is to introduce methacrylic group into polyester to give it a polymerizing property, or to strengthen it through the formation of urethane combination between remaining isocyanate group in the partially urethanated compound formed in the first step and hydroxyl group in the polyester, so that it is necessary to use a polyester containing sufficient amount of hydroxyl group.

Furthermore, a portion of carboxyl group is left in the polyester at the terminal end of the molecule, and isocyanate also reacts and combines with this carboxyl group. This reaction, however, has a far small reaction velocity as compared with that of the reaction with hydroxyl group, and in order to promote this reaction, it is necessary to heat it at a high temperature for a long time. However, methacrylic group is liable to polymerize and there is a risk of gelation through cross linking, so that the heating for a long time is not preferable. Therefore, the carboxyl group at the terminal of polyester is practically useless for combining the partially urethanated compound.

The ratio of combining partially urethanated compound to the polyester becomes maximum when it is used as much as equal equivalent of isocyanate group remaining in the partially urethanated compound to the equivalent of hydroxyl group in polyester, but it is possible to select the value lower than the ratio shown according to the degree desired to give polymerization property to the polyester.

With respect to the partially urethanated compound, when the compounding ratio of, e.g., HEMA is smaller than $(n-1)$ is said formula (8), there remains in the partially urethanated compound a large quantity of components either those of not urethanated or those having a low degree of urethanation, that is, the components having 2 or more isocyanates, which acts to connect two or more molecules of polyester by urethane combination, causing to increase the viscosity of the final composition remarkably, and in extreme case, causing gelation so that it cannot be used any longer, then this case is not preferable. On the contrary, when the ratio is larger than $(n-1)$, the portion in which all isocyanate group in the polyisocyanate is urethanated becomes large. This cannot combine with the terminal hydroxyl group of polyester molecule, so that it is undesirable for linear propagation of molecule in the step of curing. However, such a completely urethanated compound has 2 or more methacrylic group in one molecule, and since it is a polyfunctional polymerizable compound, it is useful to increase the degree of formation of cross linking in the hardening step of finally produced composition, and is effective similarly to the methacrylic group combined at the terminals of the molecule chain of polyester.

Usually, polyester is a solid or very viscous liquid, so that it is difficult to cause it to react with the partially urethanated compound in the state of uniform mixture, but the reaction may be effected by heating at a high temperature turning it into a low viscosity liquid, and by mixing with partially urethanated compound. In this case, there is a possibility of gelation due to the polymerization between each of methacrylic groups, or to the copolymerization between methacrylic group and fumaric group in unsaturated polyester. Accordingly, in order to proceed the reaction smoothly without such a trouble, it is preferable to adjust the viscosity of the polyester in the state of being easily stirred by dissolving it into a proper volatile solvent or a polymerizable liquid monomer or their mixture, and admixing the partially urethanated compound for reaction at room temperature or near thereto. No particular solvent nor polymerizable monomer is restricted here, but those having, in their molecule, functional groups which react easily with isocyanate groups such as amino group, hydroxyl group are not suitable in the object of the present invention.

The reacting condition differs according to the kind of polyisocyanates used, but generally speaking, since velocity of urethane formation is fairly large, the reaction can be carried out at room temperature. Or, it may be heated to an extent in which no polymerization of methacrylic group combined with polyisocyanate compound or polymerizable monomer used would occur.

The product produced by reaction between saturated polyester or unsaturated polyester and a partially urethanated compound, which is produced by adding HEMA or the like to polyisocyanate compound, is an unsaturated polyester having remarkably intensified radical polymerizing property. In this state, it can not be left as it is, because it causes polymerization reaction in a short time even at a room temperature, increasing its viscosity considerably, and finally turns into gel material which is not applicable any longer. Such are the practical difficulties, and in some severe cases, the gelation occurs already in heating step, and no desirable product is obtained. To prevent such an inconvenience, it is effective to add comparatively large amount of polymerization inhibitor previously at the beginning of the heating reaction. As for the kinds of the polymerization inhibitor used here, those having a low reactivity with isocyanate such as quinhydrone or chloranil will be suitable.

In this way, when all or major part of isocyanate in the partially urethanated compound is consumed, a volatile solvent or liquid polymerizable monomer is added, when necessary to make the composition proper, and at the same time regulating the viscosity. Containing already scarcely or no free isocyanate group in the composition in this stage, so that it is possible to use volatile solvent or monomer having hydroxyl or amino groups. When there is a possibility of remaining a small amount of isocyanate group in the free state, it is rather desirable to add a small amount of lower alcohol so as to increase the storage stability.

To the composition thus prepared, pigments, dyestuffs, fillers, and other ingredients are added if necessary, and dispersing them uniformly using mixer such as ball mill.

The composition prepared according to the process of the invention can be applied to a surface of an article as a coating material, and can be hardened by various process to a tough film. As to the method of hardening, it will of course be effective to add previously to the composition a redox system polymerization initiator such as methyl ethyl ketone peroxide-cobalt naphthenate, and the like, but the advantage and merit of the process according to the present invention will become far more distinguishable when the composition is applied and irradiated with ionizing radiation, and which will contribute much to the improvement of productivity in this industrial field.

Now, several examples will be shown hereinafter. These examples are shown for the purpose of illustration, and by no means restriction.

EXAMPLE 1.

Into a 2 liter four neck flask were charged 45.8 g (molar ratio 0.1) of phthalic anhydride, 71.8 g (molar ratio 0.2) of fumaric acid, 203.0 g (molar ratio 0.4) of 3,6-endomethylene-1,2,3,6-tetrahydro-cis-phthalic anhydride, 135.5 g (molar ratio 0.3) of adipic acid, 129.9 g of linseed oil fatty acid (molar ratio 0.15, mean molecular weight is as 280), 289.6 g (molar ratio 0.9) of neopentyl glycol and 124.4 g (molar ratio 0.3) of trimethylolpropane. The content was condensed at 190° to 210° C for about 13 hours in nitrogen atmosphere. Then, unsaturated polyester having an acid value of 9.8 and a hydroxyl value of 174 was obtained.

Into another 1 litre four neck flask was charged 336 g (2 mols) of hexamethylene diisocyanate. It was maintained at 40° – 50° C on water bath, dropping thereinto 260 g (2 mols) of HEMA through a dropping funnel in about 1 hour while keeping agitation, and further maintaining it at 45° – 50° C for 2 hours, after which it was cooled, and partially urethanated compound was obtained (hereinafter this partially urethanated compound is called "HMDI adduct").

Next, dissolving 40 g of said unsaturated polyester into a mixture containing 25 g of styrene and 25 g of methyl methacrylate, adding 50 mg of quinhydrone, further adding 10 g of said HMDI adduct, and heating it at 70° – 80° C for about 1.5 hours, modified unsaturated polyester varnish was obtained.

For comparison, an unsaturated polyester varnish was prepared only by dissolving 50 g of said unsaturated polyester into a mixture containing 25 g of styrene and 25 g of methyl methacrylate without modification by HMDI adduct.

Applying these varnishes each on a single surface of a glass plate so that the thickness is 20 microns, and immediately after which, electron beam having an energy of 0.8 MeV are irradiated by means of van de Graaff type electron accelerator each about 80 μ A.sec/cm$^2$, and cured films were obtained. The pencil hardness (JIS K 5651, 5.13) of these cured films were obserbed, and stripping off the coating films from the glass plates, and measured the gel fraction (insoluble component in hot N,N-dimethylformamide).

Separately, adding and mixing into each of 50 g of the above varnished 1 g of methyl ethyl ketone peroxide (60 percent solution in dimethyl phthalate) and 0.5 g of colbalt naphthenate (a xylen solution containing 6.25 percent of metalic cobalt), applying the mixture on one surface of glass plates in a thickness of 20 microns, and after leaving them for 7 days at room temperature, comparison was carried out under similar tests.

The results of these test are shown in Table 1.

TABLE 1

| Sample Method of curing | Modified | | Not Modified | |
|---|---|---|---|---|
| | Electron beam | Peroxide | Electron beam | Peroxide |
| Tests | | | | |
| Pencil hardness[1] | B–HB | B | 2B | 3B |
| Gel fraction (%)[2] | 81.4 | 70.6 | 63.1 | 34.4 |

Note [1] Sharpening the point of the drawing pencil "UNI" made by Mitsubishi Pencil Co., Ltd., Japan into a column, exposing the lead about 3 mm, grinding the tip with a grinding paper (No. 400), and sharpen the lead flat with the edge acute, and applying the pencil at an angle of 45°against the coated surface and push it forwardly at a temperature of 20° C. Repeating this process for pencils having various hardnesses from soft to hard (6B, . . . B, HB, F, H, . . . 9H). When a scratched trace is left on the coated surface, the pencil hardness is determined by the hardness mark of the hardest pencil which does not produce scratch trace. (Summary of JIS K 5651, 5.13)

[2] 0.2–0.3 g of sample is put into a glass filter 1G3, soaking it in N,N-dimethyl formanide of 100°–120° C for about 30 hours, removing the dissolved portion by filtration, rinsing it with acetone, after which drying it at 110° C for 3 hours, and weighing, the gel fraction was calculated by the following formula:

Gel Fraction (%) = (Weight of residue after dissoltion)/(Weight of sample) × 100

From the value of this gel fraction, it is possible to find relative degree of formation of cross linkage.

EXAMPLE 2.

Dissolving 72 g of unsaturated polyester obtained by Example 1 into a mixture consisting of 50 g of styrene and 60 g of methyl methacrylate, adding 100 mg of quinhydrone, adding also 18g of HMDI adduct, and heating at 70° – 80° C for about 1.5 hours, modified polyester varnish was obtained.

For comparison, dissolving 90 g of said unsaturated polyester into a mixture consisting of 50 g of styrene and 60 g of methyl methacrylate, a varnish not modified with HMDI adduct was obtained.

For each of these varnishes, adding and dispersing the same weight ratio of rutile-type titanium dioxide using porcelain ball mill, two sorts of white, unsaturated polyester enamels were obtained.

Applying these white enamels on one surface of zinc phosphate treated galvanized steel plate of about 0.3 mm thickness with film thicknesses of about 20 microns. Immediately thereafter curing is effected by irradiating electron beam of about 80 μ A. sec/cm$^2$ as in Example 1. Various tests on cured films were performed on these coated plates. The results are shown in Table 2.

TABLE 2

| Sample | Using modified varnish | Using unmodified varnish |
|---|---|---|
| Tests | | |
| Pencil hardness[1] | 3H–4H | F |
| Erichsen test[2] | Almost no peeling off | Peeled off by about half |
| Solvent resistance test[3] | 100 or more | 12 |
| Tackiness test[4] | Passed | Rejected |
| Humidity resistance test[5] | Almost no change for 7 days | Formation of swelling after 2 days |

Note [1] The same as in the note (1) in Example 1.

[2] Forming 10 x 10 mm cross-cutting at an interval of 1 mm by scratching to the base in direction of perpendicular to each other, after which the cut part was pushed out for 6 mm in the depth by Erichsen tester, attaching self-adhesive tape on said portion, and stripping off the tape rapidly, then the peelings of the checked portion are counted.

[3] Rubbing the coated surface with a gauze soaked with xylene applying an uniform pressure by hand, the number of reciprocation until the exposure of the base is counted.

[4] The test plate is placed horizontally with the coated surface upside, covering with the gauze, and placing thereon with a 500 g columnar weight having a bottomn diameter of 4 cm, then the test plate is heated at 70° C for 2 hours. Test is regarded as passed when no resistance is felt for stripping the gauze after being cooled and no mark of the gauze is left thereon.

[5] The condition of coated film which is stood still in saturated aqueous vapor at 50° C is observed.

EXAMPLE 3.

Heating and condensing 355.2 g (2.4 mols) of phthalic anhydride, 233.6 g (1.6 mols) of adipic acid, 304.0g (4.0 mols) of propylene glycol and 80.4 g (0.6 mol) of trimethylol propane at 210° – 220° C for 12 hours, a saturated polyester having an acid value of 7.4 and hydroxyl value of 1.41 was obtained. Dissolving 35 g of this polyester into a mixture consisting of 25 g of styrene and 25 g of methyl methacrylate, adding 25 mg of quinhydrone and 15 g of HMDI adduct, and heating it to about 70° – 80° C for 1.5 hours, a modified polyester varnish was obtained. For comparison, a varnish was prepared only by dissolving 50 g of said saturated polyester into a mixture consisting of 25 g of styrene and 25 g of methyl methacrylate without modification by HMDI adduct. Furthermore, each 50 mg paraffin wax was added into each of these varnishes as an air insulator.

Applying these varnishes each on one surface of a glass plate so as to form a film of about 20 microns thickness, and immediately after which irradiated electron beam of about 80 μ A.sec/cm² as in the case of Example 1. The results are shown in Table 3.

TABLE 3

| Sample | Modified | Not modified |
| --- | --- | --- |
| Tests | | |
| Pencil hardness[1] | H–2H | —(not hardened) |
| Gel fraction[2] (%) | 83.7 | 0.7 |

Note [1] The same as the note (1) in Example 1.
[2] The same as the note (2) in Example 1.

EXAMPLE 4.

Charging 168 g (1 mol) of hexamethylene diisocyanate into a 0.5 liter four neck flask, maintaining the temperature at 40° – 50° C on water bath, dropping thereinto 144 g (1 mol) of HPMA through dropping funnel while keeping agitation, and further maintaining the temperature at 45° – 50° C for 2 hours, the partially urethanated compound (adduct) was obtained.

Separately, dissolving 40 g of unsaturated polyester into a mixture consisting of 25 g of styrene and 25 g of methyl methacrylate, adding 50 mg of quinhydrone and 10 g of said adduct, and heating it at 70° – 80° C for about 2 hours, a modified unsaturated polyester varnish was obtained.

The same test is effected on these varnishes as in the Example 1. The results are shown in Table 4.

TABLE 4

| Sample | Modified | Not modified (Example 1) |
| --- | --- | --- |
| Tests | | |
| Pencil hardness[1] | B | 2B |
| Gel fraction (%)[2] | 79.5 | 63.1 |

Note 1 The same as the note (1) in Example 1.
[2] The same as the note (2) in Example 1.

EXAMPLE 5.

Charging 174 g (1 mol) of tolylene diisocyanate into a 0.5 liter four neck flask, maintaining the temperature at 40° – 50° C, dropping 130 g (1 mol) of HEMA through dropping funnel in one hour while keeping agitation, and maintaining further the temperature at 40° – 45° C for 1 Hour, a partially urethanated compound (adduct) was obtained.

Separately, dissolving 40 g of unsaturated polyester obtained in Example 1 into a mixture consisting of 25 g of styrene and 25 g of methyl methacrylate, adding 50 mg of quinhydrone and 10 g of said adduct, and heating it at 70° – 80° C for about 1.5 hours, a modified unsaturated polyester varnish was obtained.

Tests were conducted on these varnishes as in Example 1. The results are shown in Table 5.

TABLE 5

| Sample | Modified | Not modified (Example 1) |
| --- | --- | --- |
| Tests | | |
| Pencil hardness[1] | HB | 2B |
| Gel fraction (%)[2] | 75.6 | 63.1 |

Note [1] The same as the note (1) in Example 1.
[2] The same as the note (2) in Example 1.

EXAMPLE 6.

Charging 191 g (0.4 mol) of Desmodur N (Trade name, afore-mentioned) into a 0.5 liter four neck flask maintaining the temperature at 40° – 50° C on water bath, dropping 104 g (0.8 mol) of HEMA thereto through a dropping funnel in one hour while keeping agitation, and maintaining further at a temperature of 45° – 50° C for 2 hours, partially urethanated compound (adduct) was obtained.

Separately, dissolving 40 g of unsaturated polyester obtained in Example 1 into a mixture consisting of 25 g of styrene and 25 g of methylemethacrylate, adding 50 mg of quinhydrone and 10 g of said adduct, and heating at 70° – 80° C for about 2 hours, a modified unsaturated polyester varnish was obtained.

These varnishes were tested as in Example 1, and the results are shown in Table 6.

TABLE 6

| Sample | Modified | Not modified (Example 1) |
| --- | --- | --- |
| Tests | | |
| Pencil hardness[1] | 2B–B | 2B |
| Gel fraction (%)[2] | 69.6 | 63.1 |

Note [1] The same as the note (1) in Example 1.
[2] The same as the note (2) in Example 1.

From the above shown Examples, when compared with the cured film obtained from the composition in which a partially urethanated compound is not used together, and with that obtained by curing using a conventional polymerization initiator without using the irradiation of electron beam, it is clear that the cured film obtained by coating a body with the unsaturated polyester composition modified by polyisocyanate compound and HEMA and the like, and irradiated by electron beam (generally speaking, ionizing radiation) by the process according to the present invention, has a larger proportion of cross linkage and a higher hardness of the film, and nevertheless has a large flexibility, and excellent resistivity against solvents and moisture.

Also, with the composition according to the present invention in view of its molecular structure, by the double bond of methacrylate group at the terminals, polyester molecule grows into a relatively linear chain form by polymerization, and in which there exist urethane bonds so that the resin composition combines tightly with the cross linkage between molecules, and adheres to the substrate to be coated, thus presenting characteristics of excellent flexibility as well as hardness, accordingly it is concluded that the composition is suitable as coating material.

What is claimed is:

1. A process for coating articles which comprises
   a. forming a partially urethenated compound by reacting at least one hydroxymethacrylic acid ester selected from the group consisting of 2-hydroxyethyl methacrylate, 2-hydroxy-1-methylethyl methacrylate and 2-hydroxypropyl methacrylate with a polyisocyanate having two or more isocyanate groups, the ratio of polyisocyanate to hydroxymethacrylate being such that about one free isocyanate group per molecule of polyisocyanate remains unreacted, with the proviso that the hydroxymethacrylate be added in small increments to the polyisocyanate until the reaction forming the partially urethenated compound is complete;
   b. reacting said partially urethenated compound with a polyester containing a free hydroxyl group so as to effect reaction with the remaining isocyanate group of the partially urethenated compound, to form an unsaturated polyester composition;
   c. applying said composition to a substrate to form a coating thereon; then
   d. subjecting said coating to ionizing radiation in order to cure said coating.

2. A process for coating articles as claimed in claim 1 wherein said methacrylic acid ester is at least one compound selected from the group consisting of $\beta$-hydroxyethyl methacrylate and hydroxypropyl methacrylate.

3. A process for coating articles as claimed in claim 1 wherein said isocyanate compound is selected from the group consisting of diisocyanates and triisocyanates.

4. A process according to claim 3, wherein said polyisocyanate is selected from the group consisting of tolylene diisocyanate, xylylene diisocyanate, hexamethylene diisocyanate, hexamethylene diisocyanate, diphenylmethane 4,4'-diisocyanate, $C_2H_5C(CH_2OCONHC_6H_5CH_3NCO)_3$, and $OCN(CH_2)_6N[CONH(CH_2)_6NCO_2]$.

5. A process according to claim 1, wherein the reaction of step b) is conducted in an inert solvent.

6. A process according to claim 1, wherein said solvent is selected from the group consisting of styrene and methyl methacrylate and mixtures thereof.

7. A process according to claim 1, wherein the reaction of step b) is conducted in the presence of a polymerization inhibitor.

8. A process according to claim 7, wherein the polymerization inhibitor is selected from the group consisting of quinhydrone and chloranil.

* * * * *